(12) United States Patent
Taylor

(10) Patent No.: US 6,470,831 B1
(45) Date of Patent: Oct. 29, 2002

(54) ANIMAL CONFINEMENT DEVICE

(76) Inventor: William Taylor, 55 Letterloan Road, Macosquin, Coleraine, Co Londonderry, BT51 4PP (IE)

( * ) Notice: Subject to any disclaimer, the term of this patent is extended or adjusted under 35 U.S.C. 154(b) by 0 days.

(21) Appl. No.: 09/936,769

(22) PCT Filed: Mar. 10, 2000

(86) PCT No.: PCT/GB00/00837

§ 371 (c)(1),
(2), (4) Date: Jan. 23, 2002

(87) PCT Pub. No.: WO00/53002

PCT Pub. Date: Sep. 14, 2000

(30) Foreign Application Priority Data

Mar. 11, 1999 (GB) ............................................. 9905551

(51) Int. Cl.[7] ............................ A01K 15/04; A01K 1/00
(52) U.S. Cl. ........................................ 119/751; 119/525

(58) Field of Search ................................ 119/525, 731, 119/751, 752, 754, 756, 757

(56) References Cited

U.S. PATENT DOCUMENTS

| 4,304,195 A | * | 12/1981 | Christophersen | ............ 119/731 |
| 4,357,906 A | * | 11/1982 | Kratky | ........................ 119/731 |
| 5,056,466 A | * | 10/1991 | Dessing et al. | ............. 119/525 |
| 5,158,041 A | * | 10/1992 | Schmitz | ...................... 119/751 |
| 5,655,484 A | * | 8/1997 | Aaberg | ........................ 119/751 |

* cited by examiner

Primary Examiner—Charles T. Jordan
Assistant Examiner—Elizabeth A. Shaw
(74) Attorney, Agent, or Firm—Brinks Hofer Gilson & Lione

(57) ABSTRACT

A confinement device for a four-legged animal is provided. The confinement device comprises a frame to receive the animal and a floor plate for the rear legs of the animal. The floor plate is arranged such that it is stable only when both rear legs of the animal bear down on the floor plate.

21 Claims, 5 Drawing Sheets

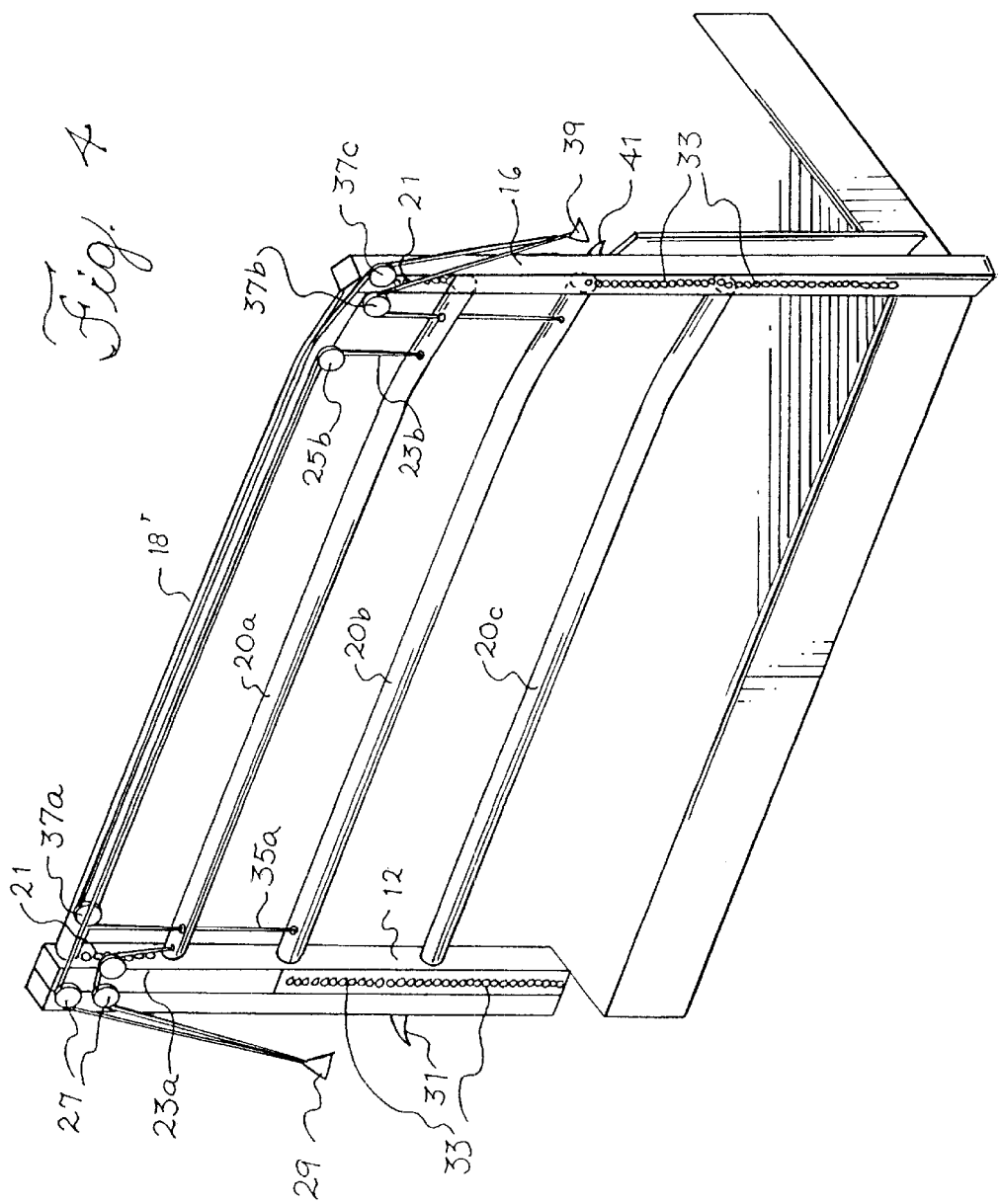

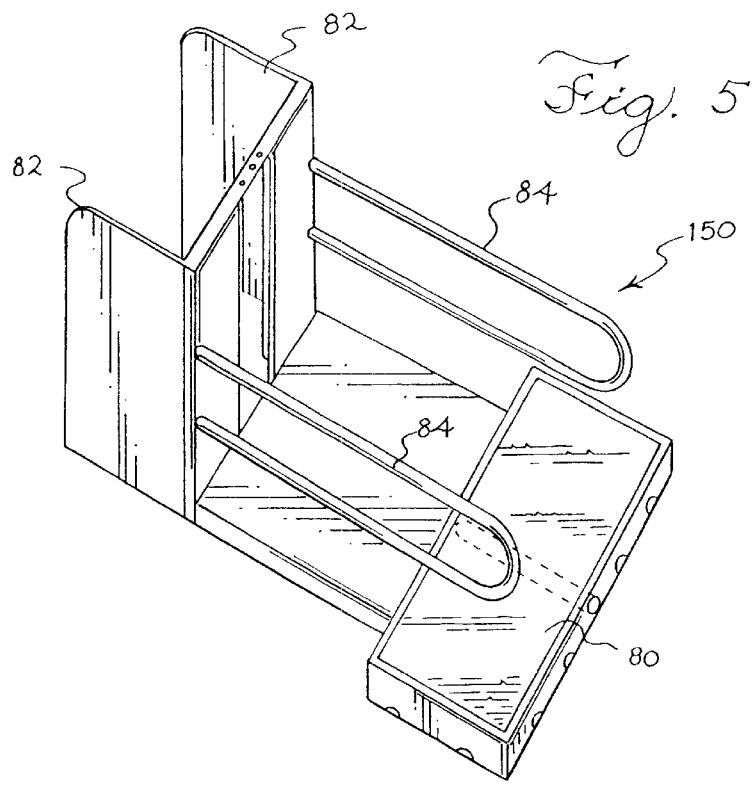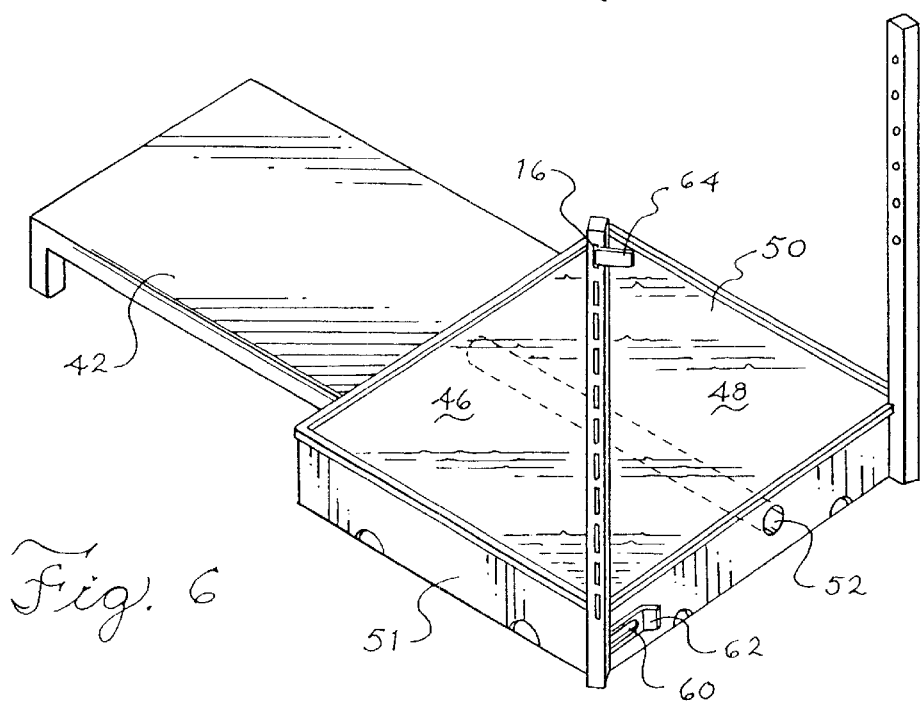

ANIMAL CONFINEMENT DEVICE

CLAIM FOR PRIORITY

The present application claims priority to PCT Application No. PCT/GB00/00837 filed Mar. 10, 2000, entitled "Animal Confinement Device," which claims priority to Great Britain Application No. 9905551.9, filed Mar. 11, 1999, and the entire disclosures of the above-referenced applications are herein incorporated by reference.

FIELD OF THE INVENTION

The present invention relates to an animal confinement device, also referred to as a livestock control device, and in particular to a device for use in conjunction with other livestock retaining devices such as cattle crushes, lamb adopters, milking parlors or stables. The device of the present invention is designed for use on farms or in other situations where the control of livestock is required.

DESCRIPTION OF THE RELATED ART

Cattle crushes, lamb adopters, milking parlors, stables and other such devices are commonly found on farms where it is desirable to hold an animal firmly in a fixed position. Such devices usually entail restraining the animal by the head or body to allow for example veterinary examination or grooming. However, these devices do not serve to restrain the hind legs of the animals. Consequently any person or other animal in the vicinity of the hind quarters of the animal can be seriously hurt if the animal decides to kick out with its hind legs.

The present invention seeks to address this problem by providing a restraining device in which the animal is restrained by the head and/or the body and is prevented from kicking out its hind quarters.

BRIEF SUMMARY OF THE INVENTION

In a first embodiment of the present invention, a confinement device for a four-legged animal is provided. The confinement device comprises a frame to receive the animal and a floor plate for the rear legs of the animal. The floor plate is arranged such that it is stable only when both rear legs of the animal bear down on the floor plate.

In a second embodiment of the present invention, a portable animal confinement device for a four-legged animal is provided. The confinement device comprises a floor staging and a floor plate for supporting the hind quarters of the animal. The floor plate is pivotably mounted such that any movement of the animal's hind quarters causes the floor plate to rock, thereby discouraging the animal from moving.

In a third embodiment of the present invention, a crush gate is provided. The crush gate comprises two pivotable leaves having a minimum separation between them when they are aligned. The leaves are adapted to pivot to an entry position to an intermediate extent sufficient to allow passage of the head, but not the shoulders, of an animal for which the crush gate is to be employed. The leaves are adapted to pivot to a full extent in an exit direction to allow the animal to pass through the crush gate and be released. The leaves have gaps formed in them that are adapted to receive the horns of an animal whose head is passing through the crush gate when the leaves are pivoted to an intermediate extent.

In a fourth embodiment of the present invention, a confinement device for a four-legged animal is provided. The confinement device comprises a frame to receive the animal and a floor plate for the rear legs of the animal. The floor plate is arranged to be stable only when both rear legs of the animal bear down on the floor plate. A crush gate is provided having two pivotable leaves with a minimum separation between them when aligned. The leaves are adapted to pivot in an entry direction to an intermediate extent to permit passage of the head, but not the shoulders, of the animal for which the crush gate is intended to be employed. The leaves are adapted to pivot to a full extent in an exit direction to allow the animal to pass through the crush gate and be released. The leaves have gaps formed in them that are adapted to receive the horns of an animal whose head is passing through the crush gate when the leaves are pivoted to an intermediate extent.

BRIEF DESCRIPTION OF SEVERAL VIEWS OF THE DRAWINGS

FIG. 4 is a perspective view of a preferred side bar arrangement for a cattle crush; employing the present invention;

FIG. 5 is a perspective view of an alternative embodiment of the present invention in use with a lamb adopter;

FIG. 6 is a perspective view of a portable device in accordance with the present invention.

DETAILED DESCRIPTION OF THE PREFERRED EMBODIMENTS OF THE INVENTION

Figure 1:
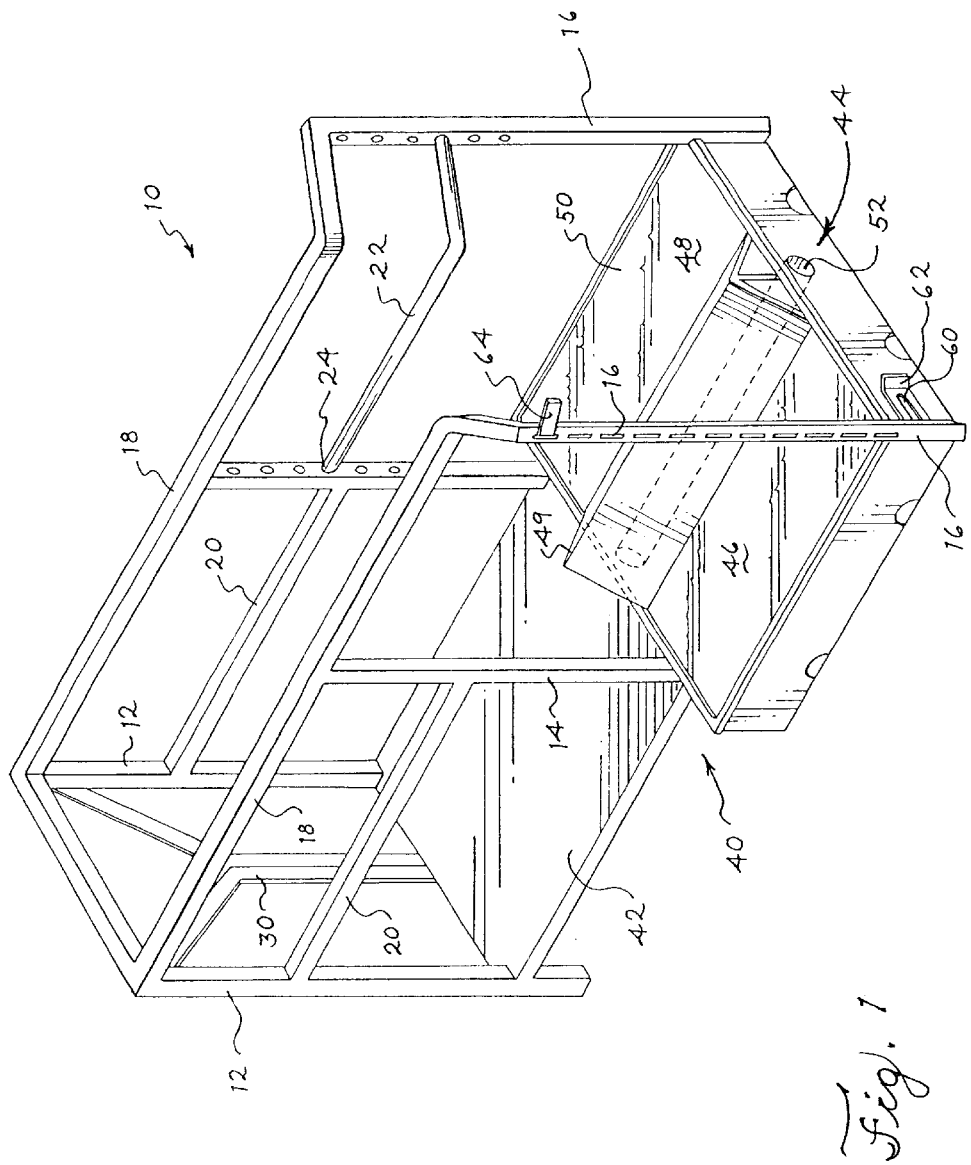
FIG. 1 is a rear perspective view of an embodiment of the present invention in use with a cattle crush.

In FIG. 1 a conventional cattle crush 10 is shown with upright supports 12, 14 and 16 and side guide rails 18, 20 and 22. The side guide rails 16, 20, 22 are secured to the upright supports 12, 14, 16 by suitable fastening devices 24, such as nut and bolt assemblies. The height of the side guide rails can be altered accordingly by means of the fastening devices depending upon the size of animal in the cattle crush.

The animal stands on the floor 40 of the cattle crush, and is held in position by means of gate crush jaws 30.

When the animal is held in position by the crush jaws 30, its front legs will be in the floor area 42, and its hind quarters will be located in the floor area 44. Specifically, the animal's hind feet will be astride the floor plate 50 and positioned at 46 and 48, respectively. An optional V-plate 49 is positionable on the plate 50 that serves to keep the animal's feet on either side of a central longitudinal axis of the crush 10.

The floor plate 50 forming part of the floor area 44 is pivotally mounted on a pivotal bar 52 which spans the length of the floor plate 50 and lies along the longitudinal axis of the crush 10.

A bolt 60 located beneath the floor plate 50 holds the floor plate 50 in place and prevents it from rocking.

The bolt 60 is attached to a shaft (not shown) passing through one of the upright supports 16. A lever 64 operates the shaft such that rotational movement of the shaft causes the bolt 60 to move away from or towards the floor plate 50. When positioned directly underneath the floor plate 50, the bolt 60 rests in a slot 62.

In operation of the device, the bolt 60 holding the floor plate 50 in position is removed from the slot 62 by rotation of the lever 64. Consequently, the floor plate 50 is no longer fixed in position and is free to rock about the pivotal bar 52. The rocking of the floor plate 50 causes the animal to sense that any movement of its hind quarters will lead to an unsettling motion of the floor plate 50. This has the effect of dissuading the animal from moving and in particular kicking its hind legs at approaching farmers, veterinarians or other animals. Consequently the animal remains calm so that it can, for example, receive medical attention, be groomed, clipped or mated without posing a threat to any other person or animal.

Figure 2:
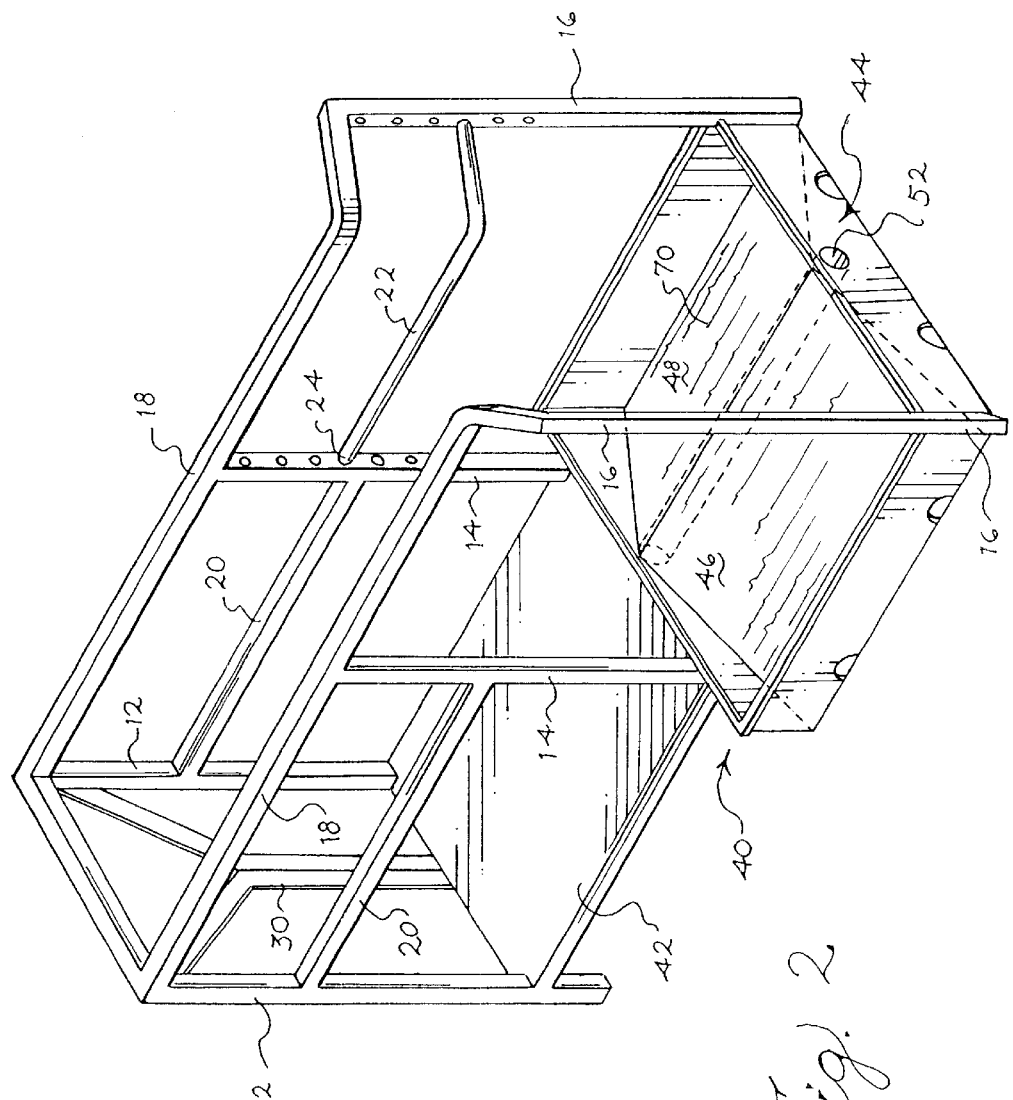
FIG. 2 is a rear perspective view of an alternative embodiment of the present invention.

In FIG. 2, features common to both FIGS. 1 and 2 are numbered accordingly.

In the embodiment in FIG. 2 there is an added deterrent to stop animals kicking out their hind quarters in the form of a floor plate 70. In this second embodiment, animals not only have to cope with the rocking action of the floor plate 70 when the bolt 60 is released, but also with the fact that the floor plate 70 is in the shape of an inverted V.

Consequently, the animal not only has to contend with the fact that the floor plate 70 rocks from one side to the other but also with the fact that the floor plate 70 is sloping away towards the side rails 18, 20 of the device.

The side rails 18, 20 are adjustable, depending upon the size of the animal in the device. The rails 18, 20 can accordingly be raised or lowered and also be brought closer together for less rotund animals.

Figure 3:
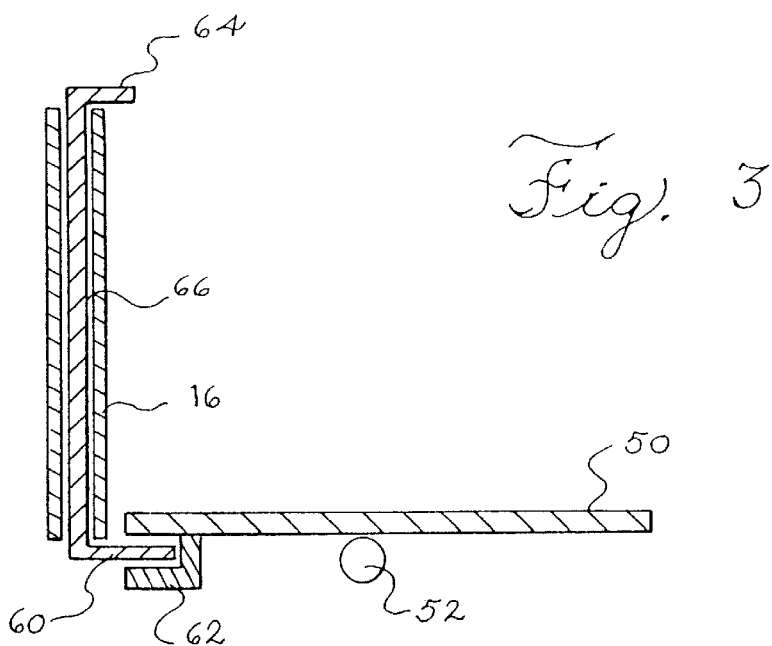
FIG. 3 is a cross-sectional view of a locking mechanism employed in the present invention.

FIG. 3 shows a cross-sectional view of a locking mechanism employed in accordance with the present invention and fixed in a locked position. The floor plate 50 is pivotably mounted about the bar 52 and locked into position by means of the bolt 60 located within the slot 62. Rotation of a shaft 66 by means of the handle 64 moves the bolt 60 into and out of the locked position. When the bolt 60 resides within the slot 62, the floor plate 50 is prevented from pivoting and the floor plate 50 remains stable when the animal stands astride it. However, removal of the bolt 60 from the slot 62 allows the floor plate 50 to pivot freely.

In FIG. 4, an alternative arrangement of side bars, made possible by the arrangement of the present invention is shown. The top bar 18' is fixed to end posts 12, 16. Rails 20a, 20b and 20c are slidable up and down on the end posts 12, 16. The lower limit of movement of the rail 20a is determined by chains 21 which depend from the top of each post 12, 16. However, the rail 20a can be raised to just beneath the top rail 20 by means of cables 23a, 23b which loop over pulleys 25a, 25b and pulley pair 27 to a handle 29. When the handle 29 is pulled and looped on the hook 31, the rail 20a is raised to its fullest extent.

Similarly, the rails 20b, 20c are limited in their upward movement by chains 33. Cables 35a, 35b loop over pulleys 37a, 37b, 37c and terminate in a handle 39, so that when the handle 39 is released from a hook 41, the rails 20, 20b, 20c can be lowered towards the ground. Limits can be imposed, for example, by further hooks (not shown) on the post 16 over which to loop the handle 39. While such a simple arrangement of ropes, pulleys and chains is perfectly serviceable, nevertheless, hydraulic or pneumatic arrangements of a more sophisticated kind could easily be provided. The point to be emphasized is that, by virtue of the floor plate arrangement of the present invention, which unsettles and (paradoxically) calms animals within the cattle crush, the normal provision of substantial side retention of the cattle is no longer essential. Consequently, the side rails can be lowered and/or maneuvered to facilitate side access to the animal without the normally attendant risks either of being kicked or, with incomplete side retention, of the animal sidling away.

In FIG. 5 an alternate embodiment of the present invention in which a lamb adopter 150 is fitted with a pivotable floor plate 80 is shown. Lamb adopters are often used to train a ewe whose own lamb has died to accept an orphaned lamb, or to accept another lamb in addition to its own. In a lamb adopter, blinder plates 82 prevent a ewe installed in the lamb adopter 150 from seeing an adopted lamb until such time as the lamb inherits the ewe's scent. A lamb needs to feed every few hours and this would be impossible if the ewe continually kicked the lamb away. Consequently, by employing an embodiment as shown in FIG. 5, the lamb is able to feed as required throughout the day or night since any movement by the ewe will cause the floor plate 80 to rock and unnerve the ewe. Side rails 84 are adjustable to suit varying sizes of ewes.

In FIG. 6 an alternate embodiment of the present invention is shown in the form of a portable confinement device. Again, the features common to FIG. 6 and the preceding drawings have been numbered accordingly.

The device of FIG. 6 again possesses the pivotable floor plate 50, mounted within a floor staging 51. In use, the portable device is installed in a stable or stall into which the animal is to be placed. The device is so designed to substantially span the width of any stall into which it is placed. Varying sizes of the device are envisioned according to the size of stalls or stable required. Furthermore, the portable confinement device may be additionally fitted with further containment means such as jaws or blinder plates. It is also envisioned that the sides of the stable or stall will serve as suitable restraining means to prevent the animal from turning in the stall.

In operation, the portable device is positioned in the stall as required and the animal led onto the device. Once the animal is positioned on the device, the locking mechanism (60, 64, 62) is released, thereby allowing the floor plate 50 to pivot freely and encourage the animal to keep its hind quarters still. When not required, the device can be removed from the stall and stored conveniently.

Figure 7:
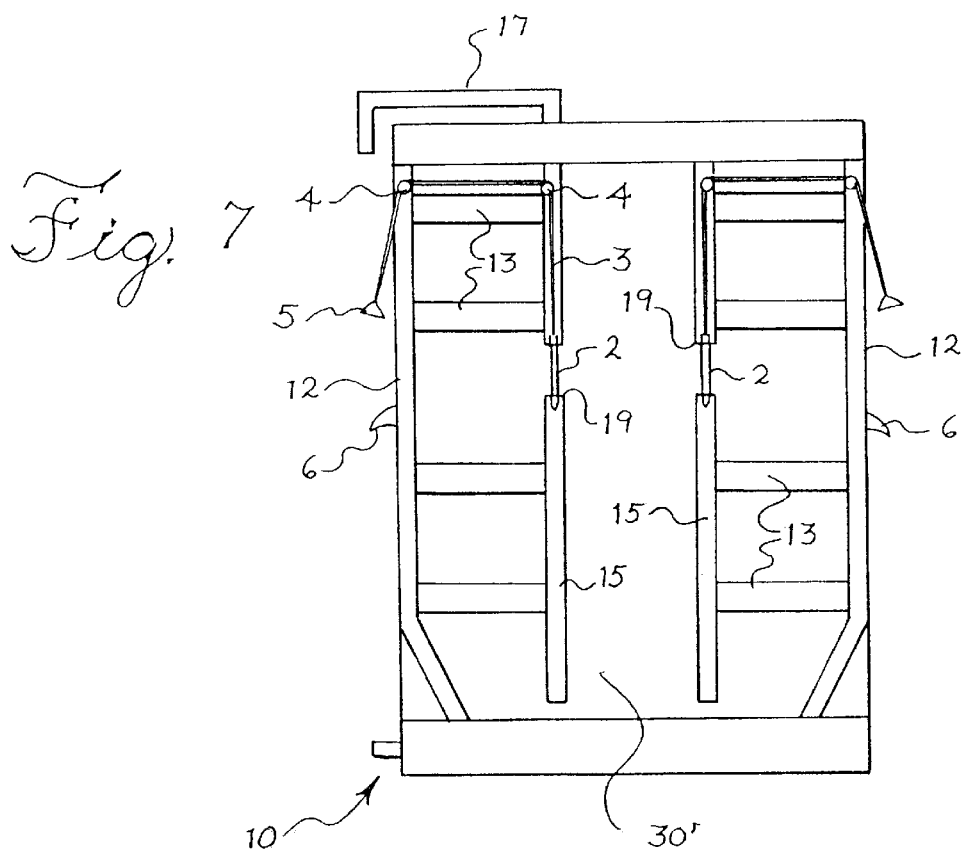
FIG. 7 is a front view of the gate of a cattle crush.

Finally, referring to FIG. 7, a cattle crush 10' is shown with a novel front gate 30'. Cattle crush gates are well known in the agricultural community and comprise two pivot rails 12 which ale pivotable in the crush 10' about vertical axes. Horizontal bars 13 connect to middle posts 15. Normally, such posts 15 extend vertically to the full height of the crush 10'.

In use, the gate 30' opens towards the animal entering the crush 10', but only sufficiently wide to permit passage of the animal's head. The reason for this is so that the animal's shoulders engage the bars 13 and, as the animal pushes forward, the gate leaves 15, 13, 12 rotate towards one another to a position in which they are aligned, and the posts 15 have their minimum separation, whereby the animal's head is totally confined such that withdrawal is prevented. A locking handle 17, engages to lock the leaves 15, 13, 12 in the position shown in FIG. 7.

To release the animal, the handle 17 is again operated, releasing the leaves 15, 13, 12 to continue pivoting forward and open completely in the direction the animal is facing. This permits the animal to leave the crush 30'.

The modification of the gate 30' illustrated is in the provision of gaps 19 in the middle posts 15 to permit the passage of horned animals. Bullets 2 on the end of cables 3 passing over pulleys 4 close the gaps 19 if required. Handles 5 can be looped onto hooks 6 formed on the posts 12 to hold the gaps 19 open.

In all cases in which the pivotable floor plate is utilized, it is desirable to incorporate drainage holes in the floor plates through which waste products can pass thereby preventing a build-up of urine, manure and any other waste products.

It is also desirable that the pivotable floor plates be made of a suitable non-slip material such as checkerplate.

It is also desirable that the device of the present invention be made of metal or other resilient material capable of withstanding the weight and force exerted upon it by animals.

While the present invention is primarily designed for use on farms, the invention may also find application in other situations where it is desirable to control animals such as in veterinarian practices or zoos.

Furthermore, the present invention may also be utilized during transportation of animals by land, air or sea where it is desirable to keep animals calm and free from stress.

Movement of the device of the present invention will depend upon the size of the device. For example, lamb adopters are typically of a size to allow them to be manhandled without the need for additional machinery. However, when moving cattle crushes, other machinery such as tractors or fork-lift trucks may be required to aid in the movement of the device.

Alternatively, the device may also be fitted with wheels and braking systems to allow for easy maneuvering.

What is claimed is:

1. A confinement device for a four-legged animal, said device comprising: a frame to receive said animal and a floor plate for the rear legs of said animal, said floor plate being arranged to be stable only when both rear legs of said animal bear on said plate.

2. The confinement device of claim 1, wherein said floor plate is pivotable about an axis longitudinal with respect to an animal received in said frame with its rear legs on said floor plate.

3. The confinement device of claim 1, further comprising a means for locating the head of said animal.

4. The confinement device of claim 1, further comprising a locking means for preventing movement of said floor plate when said device is not in use.

5. The confinement device of claim 4, wherein said locking means comprises a bolt positionable below said floor plate.

6. The confinement device of claim 5, wherein said bolt is rotatably positioned below said floor plate by means of a shaft affixed to one end of said bolt.

7. The confinement device of claim 6, wherein said floor plate further comprises a slot into which said bolt slides, thereby preventing said floor plate from moving when not in use.

8. The confinement device of claim 7, wherein said floor plate is substantially flat.

9. The confinement device of claim 1, wherein said floor plate forms or includes an inverted V-shaped portion.

10. The confinement device of claim 1, wherein said floor plate further comprises drainage holes for cleaning of said device.

11. The confinement device of claim 1, wherein said floor plate is metal.

12. The confinement device of claim 1, wherein said floor plate is checkerplate or other similar non-slip material.

13. The confinement device of claim 1 further comprising means to restrain sideways movement of said animal.

14. The confinement device of claim 13, wherein said side restraining means comprises rails.

15. The confinement device of claim 14, wherein said rails are vertically adjustable to provide access to said animal in said device.

16. A portable animal confinement device for a four-legged animal, said portable confinement device comprising: a floor staging and a floor plate for supporting the hind quarters of said animal, said floor plate being pivotably mounted within said floor staging such that any movement of said animal's hind quarters causes said floor plate to rock, thereby discouraging said animal from moving.

17. The portable confinement device of claim 3, wherein said floor plate is pivotable about an axis longitudinal to said floor staging.

18. A crush gate, said crush gate comprising: two pivotable leaves having a minimum separation between them when aligned; said leaves adapted to pivot in an entry direction to an intermediate extent sufficient to permit passage of the head, but not the shoulders, of an animal for which said crush gate is intended to be employed; said leaves being adapted to pivot to a full extent in an exit direction to permit passage through said crush gate to release said animal; and said leaves having gaps formed therein, said gaps being adapted to receive the horns of said animal whose head is passing through said crush gate when said leaves are pivoted to said intermediate extent.

19. The crush gate of claim 14, wherein a closure is provided to close said gaps when desired.

20. The crush gate of claim 19, wherein said closure comprises bullets slidable in posts forming part of said leaves.

21. A confinement device for a four-legged animal, said device comprising:

a frame to receive said animal;

a floor plate for the rear legs of said animal, said floor plate being arranged to be stable only when both rear legs of said animal bear on said floor plate; and a crush gate, said crush gate comprising:
two pivotable leaves having a minimum separation between them when aligned;
said leaves being adapted to pivot in an entry direction to an intermediate extent sufficient to permit passage of the head, but not the shoulders, of an animal for which said crush gate is intended to be employed;
said leaves being adapted to pivot to a full extent in an exit direction to permit passage through said crush gate to release said animal; and
said leaves having gaps formed therein, said gaps being adapted to receive the horns of said animal whose head is passing through said crush gate when said leaves are pivoted to said intermediate extent.

* * * * *

UNITED STATES PATENT AND TRADEMARK OFFICE
CERTIFICATE OF CORRECTION

PATENT NO. : 6,470,831 B1
DATED : October 29, 2002
INVENTOR(S) : William Taylor

It is certified that error appears in the above-identified patent and that said Letters Patent is hereby corrected as shown below:

Column 6,
Line 17, delete "claim 3," and substitute -- claim 16, -- in its place.

Signed and Sealed this

Twenty-second Day of July, 2003

JAMES E. ROGAN
*Director of the United States Patent and Trademark Office*